(12) United States Patent
Priyadarshi et al.

(10) Patent No.: US 10,223,278 B2
(45) Date of Patent: Mar. 5, 2019

(54) SELECTIVE BYPASSING OF ALLOCATION IN A CACHE

(71) Applicant: QUALCOMM Incorporated, San Diego, CA (US)

(72) Inventors: Shivam Priyadarshi, Morrisville, NC (US); Brandon Harley Anthony Dwiel, Boston, MA (US); Rami Mohammad A. Al Sheikh, Morrisville, NC (US); Harold Wade Cain, III, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 15/273,270

(22) Filed: Sep. 22, 2016

(65) Prior Publication Data

US 2017/0293565 A1 Oct. 12, 2017

Related U.S. Application Data

(60) Provisional application No. 62/320,384, filed on Apr. 8, 2016.

(51) Int. Cl.
*G06F 12/00* (2006.01)
*G06F 12/0888* (2016.01)
(Continued)

(52) U.S. Cl.
CPC ...... *G06F 12/0888* (2013.01); *G06F 12/0811* (2013.01); *G06F 12/126* (2013.01);
(Continued)

(58) Field of Classification Search
CPC ............... G06F 12/0888; G06F 12/126; G06F 2212/6046; G06F 12/084; G06F 2212/1021; G06F 2212/502
See application file for complete search history.

(56) References Cited

U.S. PATENT DOCUMENTS 6,266,742 B1 * 7/2001 Challenger ......... G06F 12/0888
711/133
6,393,525 B1 5/2002 Wilkerson et al.
(Continued)

OTHER PUBLICATIONS

Baozhong Y.U., et al., "Global Priority Table for Last-Level Caches", Dependable, Autonomic and Secure Computing (DASC), 2011 IEEE Ninth International Conference on, IEEE, Dec. 12, 2011 (Dec. 12, 2011), XP032086445, pp. 279-285.
(Continued)

*Primary Examiner* — Mark A Giardino, Jr.
(74) *Attorney, Agent, or Firm* — Muncy, Geissler, Olds & Lowe, P.C.

(57) ABSTRACT

Systems and methods are directed to selectively bypassing allocation of cache lines in a cache. A bypass predictor table is provided with reuse counters to track reuse characteristics of cache lines, based on memory regions to which the cache lines belong in memory. A contender reuse counter provides an indication of a likelihood of reuse of a contender cache line in the cache pursuant to a miss in the cache for the contender cache line, and a victim reuse counter provides an indication of a likelihood of reuse for a victim cache line that will be evicted if the contender cache line is allocated in the cache. A decision whether to allocate the contender cache line in the cache or bypass allocation of the contender cache line in the cache is based on the contender reuse counter value and the victim reuse counter value.

28 Claims, 5 Drawing Sheets

Bypass Predictor Table (51) Int. Cl.
- *G06F 12/0811* (2016.01)
- *G06F 12/128* (2016.01)
- *G06F 12/126* (2016.01)
- G06F 13/00 (2006.01)
- G06F 13/28 (2006.01)
- G06F 12/084 (2016.01)

(52) U.S. Cl.
CPC .......... *G06F 12/128* (2013.01); *G06F 12/084* (2013.01); *G06F 2212/1021* (2013.01); *G06F 2212/1028* (2013.01); *G06F 2212/283* (2013.01); *G06F 2212/502* (2013.01); *G06F 2212/6046* (2013.01); *G06F 2212/69* (2013.01); *Y02D 10/13* (2018.01)

(56) References Cited

U.S. PATENT DOCUMENTS

| | | | |
|---|---|---|---|
| 7,103,735 | B2 | 9/2006 | Iyer |
| 7,802,057 | B2 | 9/2010 | Iyer et al. |
| 2015/0134916 | A1 | 5/2015 | Padalikar et al. |
| 2015/0205724 | A1 | 7/2015 | Hancock et al. |
| 2016/0062916 | A1 | 3/2016 | Das et al. |

OTHER PUBLICATIONS

International Search Report and Written Opinion—PCT/US2017/023169—ISA/EPO—Jun. 20, 2017.

Lingda L.I., et al., "Optimal Bypass Monitor for High Performance Last-Level Caches", 2012 21st International Conference on Parallel Architectures and Compilation Techniques (PACT), ACM, Sep. 19, 2012 (Sep. 19, 2012), XP033058086, pp. 315-324.

Moinuddin K Qureshi: "Adaptive Spill-Receive for Robust High-Performance Caching in CMPs", High Performance Computer Architecture, 2009, HPCA 2009, IEEE 15th International Symposium on, IEEE, Piscataway, NJ, USA, Feb. 14, 2009 (Feb. 14, 2009), XP031435359, pp. 45-54.

Johnson T.L., "Run-Time Cache Bypassing," IEEE Transactions on Computers, Dec. 1999, vol. 48, No. 12, pp. 1338-1354.

\* cited by examiner

Bypass Predictor Table

SELECTIVE BYPASSING OF ALLOCATION IN A CACHE

CLAIM OF PRIORITY UNDER 35 U.S.C. § 119

The present Application for Patent claims the benefit of Provisional Patent Application No. 62/320,384 entitled "SELECTIVE BYPASSING OF ALLOCATION IN A CACHE" filed Apr. 8, 2016, and assigned to the assignee hereof and hereby expressly incorporated herein by reference in its entirety.

FIELD OF DISCLOSURE

Disclosed aspects are directed to processing systems. More specifically, exemplary aspects are directed to selectively bypassing allocation in a cache, such as a last-level cache in a memory hierarchy of a processing system.

BACKGROUND

A processing system may comprise one or more processors which can make requests for accessing data stored in a memory (e.g., a main memory implemented in a double data rate (DDR) implementation using dynamic random access memory (DRAM) technology). Memory requests generated by a processor may display temporal locality, which means that the requests are directed to data which was recently requested, and correspondingly also means that the same data may be requested again in the near future. To exploit temporal locality, one or more caches may be provided to store data which is determined to have likelihood of future use. The caches may be designed to be small in size to enable high speeds (e.g., in the order of few tens of clock cycles, as compared to memory access speeds which can be in the order of hundreds or thousands of clock cycles).

If the requested data is present in the cache, a cache hit results and the data can be read directly from the cache which produced the cache hit. On the other hand, if the requested data is not present in the cache, a cache miss results, and backing storage locations such as other caches or ultimately the memory may be accessed to retrieve the requested data. Since the caches are designed to be small, the limited storage space in the caches may be filled up, which means that some cache lines may need to be evicted (called victim cache lines) to accommodate incoming cache lines (called contender cache lines). Cache replacement policies are known in the art for evicting the victim cache lines and replacing them with the contender cache lines. The process of selecting which cache lines to evict is referred to as victim selection.

A last-level cache, such as an L3 cache is a backing storage location before main memory for processors and higher level caches such as L1 and L2 caches. A study of access characteristics of last-level caches reveals that a number of cache lines which were inserted in the last-level caches (e.g., upon replacing victim cache lines) may never be reused or accessed again before they are themselves evicted. Thus, these cache lines may not have served a useful purpose during their tenure in the last level cache. Moreover, these cache lines which were not reused may have displaced victim lines which may have been more useful (i.e., may have been reused) had they not been evicted. Conventional victim selection policies are designed to select a victim cache line with a low or least likelihood of future use as a candidate for eviction; but the victim selection policies do not take into account a relative usefulness or reuse potential for a contender cache line which displaces the victim cache line. Thus, there may be scenarios where a more useful cache line is replaced by a less useful cache line, e.g., in last-level caches, but these scenarios are not prevented by conventional cache management policies.

SUMMARY

Exemplary aspects of the invention are directed to systems and method for cache management. For example, disclosed systems and methods are directed to selectively bypassing allocation of cache lines in a cache. A bypass predictor table is provided with reuse counters to track reuse characteristics of cache lines, based on memory regions to which the cache lines belong in memory. A contender reuse counter provides an indication of a likelihood of reuse of a contender cache line in the cache pursuant to a miss in the cache for the contender cache line, and a victim reuse counter provides an indication of a likelihood of reuse for a victim cache line that will be evicted if the contender cache line is allocated in the cache. A decision whether to allocate the contender cache line in the cache or bypass allocation of the contender cache line in the cache is based on the contender reuse counter value and the victim reuse counter value.

For example, an exemplary aspect is directed to a method of managing allocation in a cache. The method comprises, pursuant to a miss in the cache for a contender cache line, determining a contender reuse counter value indicative of a likelihood of reuse of the contender cache line in the cache and determining a victim reuse counter value indicative of a likelihood of reuse for a victim cache line that will be evicted if the contender cache line is allocated in the cache. It is determined whether to allocate the contender cache line in the cache or bypass allocation of the contender cache line in the cache, based on the contender reuse counter value and the victim reuse counter value.

Another exemplary aspect is directed to an apparatus comprising a cache and a bypass predictor table. The bypass predictor table comprises a contender reuse counter configured to indicate of a likelihood of reuse of a contender cache line in the cache pursuant to a miss in the cache for the contender cache line, and a victim reuse counter configured to indicate a likelihood of reuse for a victim cache line that will be evicted if the contender cache line is allocated in the cache. The apparatus includes a cache controller configured to determine whether to allocate the contender cache line in the cache or bypass allocation of the contender cache line in the cache, based on the contender reuse counter value and the victim reuse counter value.

Yet another exemplary aspect is directed to an apparatus comprising a cache, means for indicating of a likelihood of reuse of a contender cache line in the cache, pursuant to a miss in the cache for the contender cache line, means for indicating a likelihood of reuse of a victim cache line that will be evicted if the contender cache line is allocated in the cache, and means for determining whether to allocate the contender cache line in the cache or bypass allocation of the contender cache line in the cache, based on the means for indicating of the likelihood of reuse of the contender cache line and the means for indicating the likelihood of reuse of the victim cache line.

Another exemplary aspect is directed to a non-transitory computer readable storage medium comprising code, which, when executed by a processor, causes the processor to perform operations for managing allocation in a cache, the non-transitory computer readable storage medium comprising code for determining a contender reuse counter value indicative of a likelihood of reuse of the contender cache line in the cache pursuant to a miss in the cache for the contender cache line, code for determining a victim reuse counter value indicative of a likelihood of reuse for a victim cache line that will be evicted if the contender cache line is allocated in the cache, and code for determining whether to allocate the contender cache line in the cache or bypass allocation of the contender cache line in the cache, based on the contender reuse counter value and the victim reuse counter value.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In aspects of this disclosure, it is observed that the number of cache misses in a cache can be reduced by bypassing (i.e. not allocating in the cache) the cache lines which are unlikely to be accessed in future (or reused/re-referenced). In order to bypass allocation of such cache lines which have a low likelihood of future access/use, exemplary mechanisms are provided to track and remember reuse characteristics of cache lines in the cache. In this way, if the cache lines are encountered in future, a decision on whether they should be allocated in the cache or if allocation in the cache for the cache lines can be bypassed, may be made based on the reuse characteristics or future access potential.

In this disclosure, an exemplary mechanism is provided for tracking the reuse pattern for cache lines, for example, on a scale or granularity of contiguous address regions referred to as "memory regions," and these patterns are utilized for making bypass decisions. It is observed that while temporal or spatial locality surrounding cache lines may be filtered by caches closer to a processor (e.g. L1, L2 caches, which can also be referred to as higher level or inner level caches) by the time the cache lines arrive at a last-level cache (e.g., an L3 cache), there may be high data-level locality with respect to memory regions to which cache lines of last-level caches may belong. In other words, reuse or re-reference characteristics may be similar or common to cache lines belonging to the same memory regions. Accordingly, some aspects are directed to selectively bypassing allocation of cache lines in a last-level cache based on reuse characteristics of the memory regions to which the cache lines belong, rather than tracking reuse characteristics of individual cache lines in making the selective bypass decisions, which leads to lower implementation costs.

In some aspects, a "memory region" as used in this disclosure, refers to a contiguous range of memory addresses, or a block of contiguous memory address locations. Thus, a high reuse memory region refers to a memory region whose addresses correspond to high likelihood of reuse of cache lines in a last-level cache; and a low reuse memory region refers to a memory region whose addresses correspond to low likelihood of reuse of cache lines in a last-level cache. For example, cache lines from high reuse memory regions may be preferentially allowed to allocate in the last-level cache, over cache lines from low reuse memory regions. To determine high and low reuse memory regions, a bypass predictor table (BPT) is disclosed, for keeping track of reuse history of addresses in a memory region.

It is recognized that if an aggressive cache bypassing method is implemented, then performance may be impacted, for example, in situations where access patterns of memory addresses in a memory region is not uniform, i.e., some addresses in a memory region are seen to have a larger number of reuses whereas some other addresses in the same memory region are seen to have a smaller number of reuses. To mitigate potential degradation of performance in the selective bypass techniques herein, a set-dueling based approach is disclosed for flexibly enabling or disabling the selective cache bypassing techniques. Furthermore, in some aspects, selective cache bypassing decisions can also be based on instruction types, wherein different instruction types can lead to different selective bypassing decisions.

It is noted that although last-level caches are used as a specific example in this disclosure, it will be understood that the disclosed aspects are not limited to last-level caches, but may be extended to any cache (e.g., caches such as L1, L2, etc. which are closer to a processor).

Figure 1A:
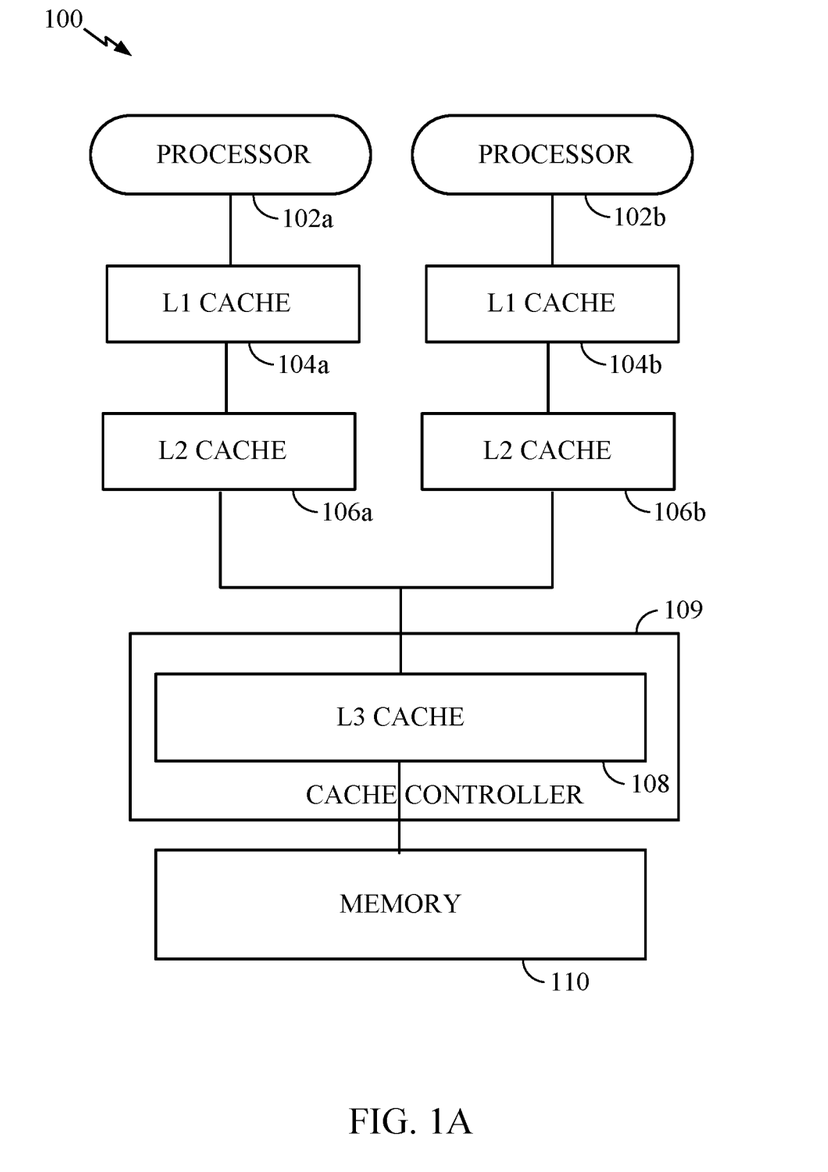
FIG. 1A depicts a block diagram of a processor system configured according to aspects of this disclosure.

With reference to FIG. 1A, processing system 100 configured according to exemplary aspects, is illustrated. Processing system 100 can include one or more processors, representatively shown as processors 102a-b, with respective higher-level L1 caches 104a-b, and L2 caches 106a-b. L3 cache 108 is shown to be a shared cache between processors 102a-b and is a last-level cache in this depiction, coupled to memory 110 (e.g., a main memory), keeping in mind that various other arrangements and cache organizations are possible within the scope of this disclosure. Cache controller 109 is shown as a block encompassing L3 cache 108, to convey logic or functionality related to management of selective allocation bypassing in L3 cache 108, but it will be understood that this representation of cache controller 109 is not intended as a limitation; rather, any alternative implementation is possible for the functionality described herein for cache management of L3 cache 108, particularly selective allocation bypassing of exemplary aspects.

Figure 1B:
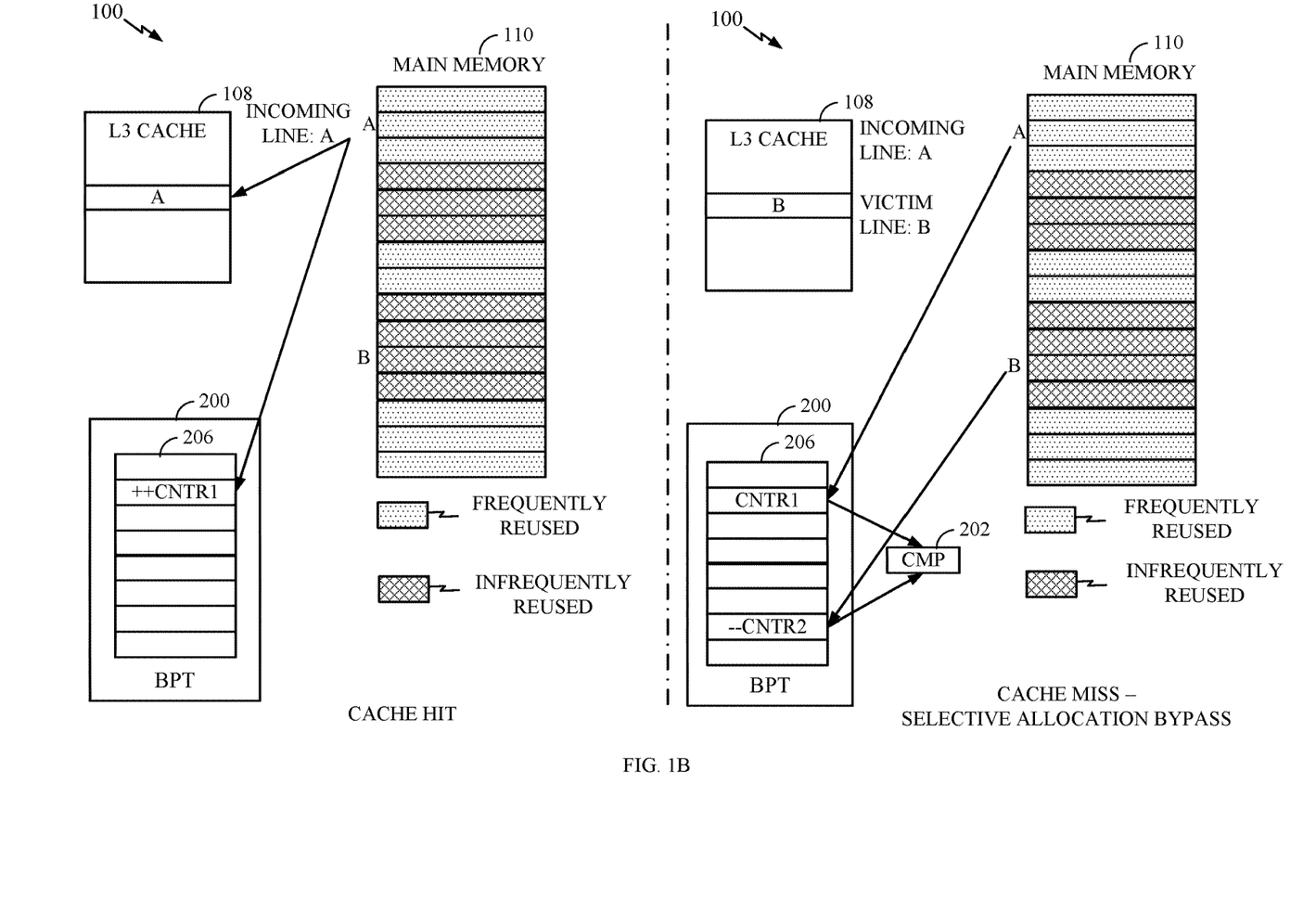
FIG. 1B illustrates aspects of selective bypassing of cache allocation, according to aspects of this disclosure.

In FIG. 1B, another view of processing system 100 is shown, featuring L3 cache 108 and memory 110 in greater detail to illustrate exemplary aspects related to selective bypassing of allocation in L3 cache 108. In this regard, two scenarios are depicted, one where there is a cache hit in L3 cache 108 for an incoming cache line A and another, where there is a cache miss for incoming cache line A. In the scenario where there is a cache miss for incoming cache line A, a decision is made whether to allocate cache line A in L3 cache 108 for servicing the cache miss or whether allocation may be selectively bypassed according to exemplary aspects of this disclosure. In other words, in the scenario where there is a cache miss for incoming cache line A, incoming cache line A is viewed as a contender cache line and another cache line which is already present in L3 cache 108, e.g., cache line B, is evaluated as a victim cache line or potential candidate for eviction from L3 cache 108 to accommodate the contender cache line if the contender cache line is to be allocated in L3 cache 108. In this regard, reuse characteristics of the contender cache line (incoming cache line A) are compared with reuse characteristics of the potential victim cache line (cache line B).

As previously discussed, in this disclosure, reuse or re-reference characteristics of cache lines may be determined based on memory regions to which the cache lines belong. Memory 110 is shown to comprise several memory regions, wherein each memory region is a block of contiguous lines of data. Some memory regions have been shown with a first shading associated with the legend "frequently reused", which is representative of a characteristic of frequent reuse of cache lines in the corresponding memory regions. Some other memory regions have been shown with a second shading associated with the legend "infrequently reused", which is representative of a characteristic of infrequent reuse of cache lines in the corresponding memory regions. In this disclosure, it is understood that cache lines belonging to a memory region having a frequent reuse characteristic are likely to be reused in L3 cache 108, while cache lines belonging to a memory region having infrequent reuse characteristics are not likely to be reused in L3 cache 108. In some instances, contender cache lines which are not likely to be reused in L3 cache 108 may be bypassed from allocation in L3 cache 108, and thus, prevented from displacing victim cache lines which are likely to be reused.

In an exemplary aspect, bypass predictor table (BPT) 200 is configured to track reuse characteristics of the memory regions of main memory 110. BPT 200 may be implemented as part of cache controller 109 in some aspects. Selected aspects of BPT 200 are shown in FIG. 1B, while a more detailed description of BPT 200 will be provided with reference to FIG. 2 in the following sections. As shown in FIG. 1B, BPT 200 may be a structure which comprises several entries, wherein each entry can include at least a counter referred to as reuse counter 206, associated with a respective memory region of memory 110. For the sake of simplicity, FIG. 1B is illustrated for the case where both an incoming cache line A and a potential victim cache line B already have respective reuse counters 206 established in associated entries of BPT 200 (while in later sections, cases where one or both of these entries may not be present in BPT 200 will be discussed in greater detail). Specifically, an entry of BPT 200 associated with incoming cache line A has a first reuse counter represented by "cntr1", which may be a means for indicating a likelihood of reuse of the incoming cache line and as such, provides an indication of the number of reuses of the incoming cache line A. An entry of BPT 200 associated with the potential victim cache line B has a second reuse counter represented by "cntr2", which may be a means for indicating a likelihood of reuse of the potential victim cache line B, and as such, provides an indication of the number of reuses of the potential victim cache line B.

In the scenario where there is a hit for the incoming cache line A, the first reuse counter is incremented, e.g., by a first amount (e.g., shown by the notation "++cntr1"). In the scenario where there is a miss for the incoming cache line A, the incoming cache line A is a contender cache line and the first reuse counter for the incoming cache line A is referred to as a contender reuse counter, and the second reuse counter for the potential victim cache line B is referred to as a victim reuse counter. To evaluate whether the incoming cache line A is to be allocated in L3 cache 108 by displacing or evicting the potential victim cache line B, the contender reuse counter (cntr1) is compared in comparator 202 with the victim reuse counter (cntr2). In some aspects, the second counter may be decremented by a second amount (e.g., shown by the notation "--cntr2") to generate a decremented victim reuse counter and the decremented victim reuse counter may be multiplied by a third amount, referred to as a multiplicative factor "f" before the comparison. In other words, the decremented victim reuse counter multiplied with the multiplicative factor "f" applied may be compared with the contender reuse counter. Based on the comparison, if the contender reuse counter is less than the decremented victim reuse counter with the multiplicative factor applied, e.g., represented by the notation cntr1<f*(-cntr2), then allocation of the incoming cache line A may be bypassed, since the potential victim cache line B may be determined to have higher likelihood of reuse and thus, retained in L3 cache 106 and not evicted for accommodating cache line A with a lower likelihood of reuse. Accordingly, some cache lines may be selectively bypassed from allocation in L3 cache 106 based on the reuse counters associated with the cache lines.

Figure 2:
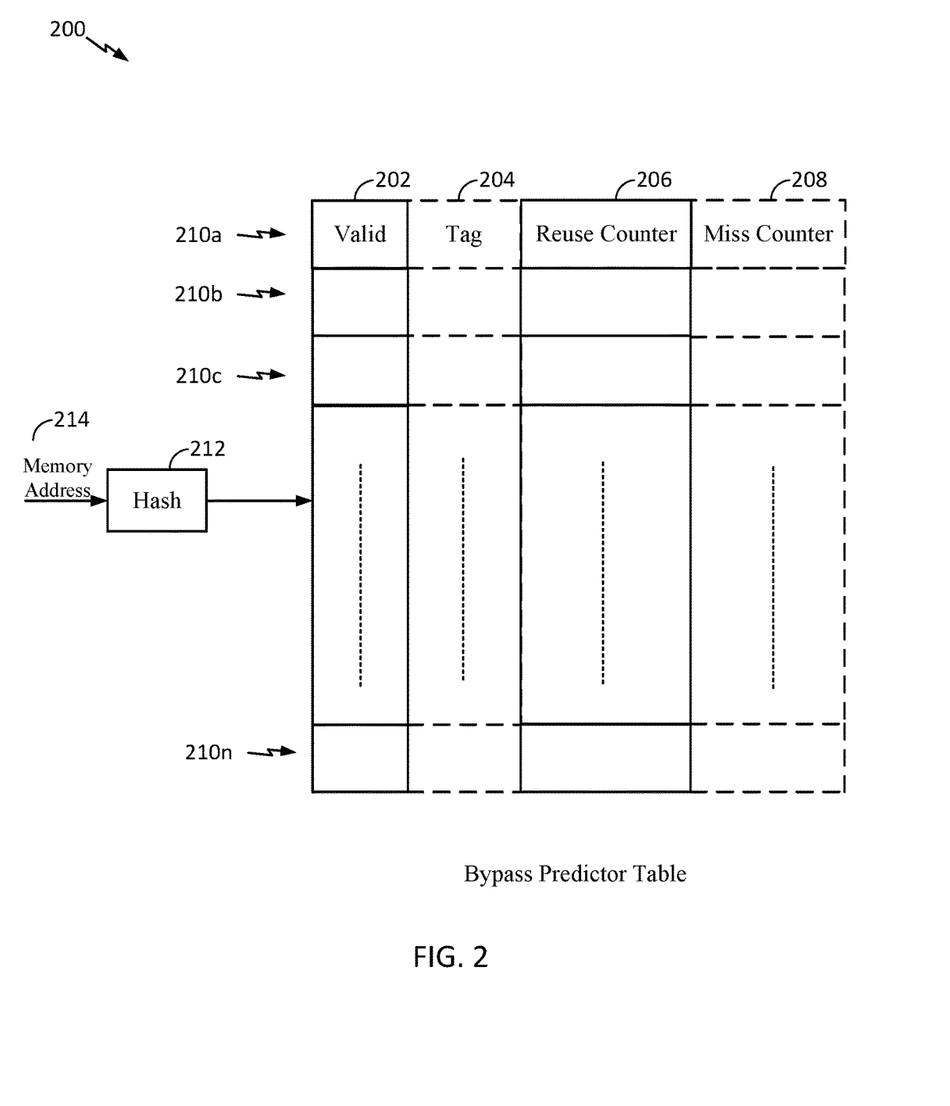
FIG. 2 illustrates a bypass predictor table configured according to aspects of this disclosure.

With combined to FIGS. 1-2, bypass predictor table (BPT) 200 configured according to aspects of this disclosure is illustrated in greater detail. As previously discussed, BPT 200 can be configured to record information (also referred to as "metadata") including reuse characteristics of memory regions. Although tracking the reuse of each cache line to provide a more accurate indication of each cache line's reuse characteristics is possible within the scope of this disclosure, in order to reduce the tracking resources in this regard, in exemplary aspects, the cache lines belonging to the same memory region may be clubbed together and reuse characteristics may be tracked for the memory regions instead. Accordingly, BPT 200 comprises a plurality of entries, representatively shown as n entries, 210a-n, each entry corresponding to a memory region. In addition to reuse counter 206 discussed with reference to FIG. 1B, each entry 210a-n may include a valid flag shown as valid 202, and optional fields shown as tag 204 and miss counter 208. The entries 210a-n may be accessed, for example, using a hash function implemented by hash block 212, on one or more bits (e.g., higher order bits) of a memory address 214 associated with cache accesses. It is possible to configure BPT 200 as a tagged structure or an untagged structure, and correspondingly, tag 204 may be present or excluded from entries 210a-n.

In more detail, if BPT 200 is implemented an untagged structure, tag 204 may be excluded as one of the fields for entries 210a-n and memory address 214 (or a hash of some or all of memory address 214) may be used to directly index into an entry of BPT 200 without further tag comparison to ascertain that an indexed entry corresponds to a particular memory region. Thus, in an untagged implementation, multiple memory regions may be mapped to the same entry of BPT 200. Valid 202 may indicate whether the corresponding entry 210a-n is valid. Correspondingly, reuse counters 206 (e.g., first counter cntr1 and second counter cntr2 discussed in relation to FIG. 1B) in each of the entries may be modified based on reuse characteristics of multiple memory regions represented by each entry, and this may lead to interference. The interference may be constructive in nature, wherein multiple memory regions influence reuse counter 206 of a corresponding entry 210a-n in like manner, which may lead to a faster training of reuse counter 206 to be representative of the similar reuse characteristics of the multiple memory regions. On the other hand, it is also possible for the interference to be destructive in nature, wherein the multiple memory regions mapping to the same entry 210a-n may have different reuse characteristics and thus reuse counter 206 in the same entry 210a-n for the multiple memory regions may not be a correct indication of the reuse behaviors of one or more of the multiple memory regions. Thus, it is recognized that while untagged implementations of BPT 200 may consume less resources, and as such may be cheaper to implement than tagged implementations of BPT 200, the decision between choosing a tagged implementation or an untagged implementation of BPT 200 may be made based on specific design goals and the above considerations of possible interference.

With continuing reference to FIG. 2, a tagged implementation of BPT 200 will now be described in greater detail. As previously mentioned, if BPT 200 is implemented as a tagged structure, tag 204 may be a field which is present in entries 210a-n. Tag 204 can comprise some bits of memory address 214 (e.g., excluding less significant bits corresponding to block offsets and set-index bits used to point to entries 210a-n). Tag 204 may be used to confirm whether an entry 210a-n corresponding to a particular memory region indexed by memory address 214, resides in BPT 200 (thus, providing more specificity than untagged structures wherein multiple memory regions may point to the same entry).

In addition to tag 204, each entry 210a-n may include the valid field, valid 202, which may be a valid flag, e.g., a valid bit to indicate whether a corresponding entry 210a-n is valid or not. Reuse counter 206, as previously discussed, in entries 210a-n may be configured as a saturating counter that counts the number of reuses of the cache lines (e.g., pursuant to cache hits) in memory regions corresponding to the entry 210a-n. Miss counter 208, also referred to as a region miss counter, may be another optional field, which will be discussed in greater detail below, and configured to count a number of consecutive cache misses incurred for a memory region corresponding to the entry 210a-n.

Considering an example implementation of BPT 200 (e.g., as implemented in cache controller 109) in more detail, if there is a hit in L3 cache 108 for a cache line (e.g., cache line A in FIG. 1B), memory address 214 of the hitting cache line is used to access a corresponding entry 210a-n, and reuse counter 206 for that entry is incremented, e.g., by a first amount, which may be an empirically determined constant (as shown in FIG. 1B, this incrementing was represented as ++cntr1).

If there is a miss in L3 cache 108 for an incoming cache line (e.g., cache line A in FIG. 1B), then the incoming or contender cache line can potentially evict an existing cache line (e.g., victim cache line B in FIG. 1B) in L3 cache 108 if allocation in L3 cache 108 is not bypassed for the incoming cache line. Thus, for the incoming cache line, reuse counter 206 of an entry 210a-n which corresponds to a memory region which comprises the incoming cache line, referred to as the contender reuse counter, is read out. Reuse counter 206 of the memory region corresponding to the victim line, referred to as the victim reuse counter, is also read out. The victim reuse counter is decremented by a second amount, which may be another empirically determined constant (this decrementing was generically represented as −−cntr2 in FIG. 1B). The decremented victim reuse counter may then be multiplied by a third amount, which may be yet another empirically determined constant, referred to as "f" and then compared with the contender reuse counter.

In the above aspect, the victim reuse counter may be decremented as noted above, in order to cause the memory region corresponding to the victim cache line (referred to as the "victim memory region") to gradually get evicted from BPT 200 if the victim memory region does not observe reuse (i.e., the victim reuse counter value is a sufficiently low value to indicate that the corresponding entry 210a-n or victim memory region is to be evicted). Further, adjusting the third amount or multiplication factor "f" can change the nature of bypassing decisions: for example, if the multiplication factor is high (e.g., "1" on a normalized scale from 0-1), then an aggressive bypassing scheme is said to be applied, wherein more decisions are made for bypassing allocation; and if the multiplication factor is low (e.g., "0.5" on the same normalized scale), then a less aggressive or more restrictive bypassing scheme is said to be applied wherein less decisions are made for bypassing allocation.

With continuing reference to BPT 200 of FIG. 2, if the memory region corresponding to the potential victim cache line does not have an entry in BPT 200 (i.e., the victim reuse counter is unavailable), a global eviction counter (GEC) may be relied upon as a substitute. Aspects pertaining to the GEC (not shown explicitly) will now be explained.

Pursuant to each cache access for an incoming cache line (irrespective of whether it results in a hit or a miss), BPT 200 is accessed to determine whether an entry 210a-n corresponding to a memory region comprising the incoming cache line is present in BPT 200 or not. As previously discussed, if the entry for the incoming or contender cache line is not present, then an entry 210a-n is inserted into BPT

200, e.g., by cache controller 109, and correspondingly, the contender reuse counter created in the entry is incremented (e.g., by the first amount). If the cache access results in a miss, then the entry 210*a-n* corresponding to a memory region comprising the potential victim cache line is also looked up, e.g., by cache controller 109, but the entry 210*a-n* corresponding to the victim cache line may not be present in BPT 200, e.g., since the entry 210*a-n* may have been evicted. In such cases where an entry 210*a-n* corresponding to the victim memory region is not in BPT 200 (keeping in mind that the entry 210*a-n* corresponding to the contender cache line's memory region, or "contender memory region" will be present in BPT 200 because it is inserted in BPT 200 on cache access, if the entry 210*a-n* is not present), the GEC is used for making a decision as follows.

The GEC computes a running average of reuse counter 206 of entries 210*a-n* corresponding to memory regions that have been evicted from BPT 200. Pursuant to an eviction from BPT 200 (which can happen when an entry is evicted in the process of inserting another entry into BPT 200), the GEC is updated by taking an average of the current value of the GEC and the reuse counter 206 of the evicted entry. Pursuant to a cache miss where an entry corresponding to the victim memory region is not present in BPT 200, the GEC may be used as a proxy for the victim reuse counter, wherein a bypassing decision can be made by comparing the GEC with the contender reuse counter in the same manner as previously explained.

With continued reference to BPT 200 of FIG. 2, miss counter 208 will now be considered in more detail. Miss counter 208 for entry 210*a-n*, or the region miss counter for the corresponding memory region, may be used to restrict bypassing, e.g., in cases where bypassing may negatively impact performance Miss counter 208 can be used in addition to and in conjunction with the set dueling approach which will be discussed below for enabling or disabling exemplary allocation bypass techniques. Miss counter 208 for an entry 210*a-n* may count consecutive misses incurred in L3 cache 108 for a memory region corresponding to the entry 210*a-n*. When the number of consecutive misses becomes greater than a pre-specified threshold, then bypassing allocation in L3 cache 108 for cache lines belonging to that memory region (or entry 210*a-n*) may be turned off until a cache hit is observed for that memory region. Once the cache hit is observed, miss counter 208 may be reset and the above process may be repeated.

As previously mentioned, a set dueling approach may be used (e.g., applied by cache controller 109) in some exemplary aspects to flexibly enable or disable the above-described selective bypassing techniques. In the set dueling approach, the number of sets in a cache, e.g., in a set-associative implementation of L3 cache 108, is divided into multiple groups of sets, e.g., three groups.

Thus, in an example, two of the three groups include a small number of sets and these groups are referred to as leader groups. The two leader groups are assigned a specific policy with respect to enabling or disabling selective bypass (the policies may be referred to as "bypassing enabled" and "bypassing disabled"). For a first leader group of the two leader groups, the policy assigned may be "bypassing enabled," whereas for a second leader group of the two leader groups, the policy assigned may be "bypassing disabled." Cache misses in the first and second leader groups may be constantly monitored, for example, using a saturating counter. For example, a cache miss in the first leader group will increment the saturating counter whereas a cache miss in the second leader group will decrement the saturating counter.

In the set dueling approach, a third group of sets of L3 cache 108 is referred to as a "follower" group comprising follower sets. For the follower sets, the bypassing policy may be assigned as the bypassing policy of the group amongst the first leader group or the second leader group which has a lower number of cache misses. The saturation counter can be used to determine which group among the first and second leader groups has the lower number of cache misses. Thus, if the first leader group has lower number of cache misses then bypassing is enabled for sets in the follower group, otherwise bypassing is disabled for sets in the follower group. In this manner, by using the set dueling approach, the above-described selective bypassing techniques using BPT 200 may be enabled or disabled for the majority of sets of L3 cache 108 (follower groups) based on performance benefits observed (e.g., less cache misses implies better performance). Viewed another way, in some aspects where set dueling is used, cache allocation for each set of L3 cache 108 may be based on based on whether or not bypassing is enabled or disabled for that set, and if it is enabled (e.g., for the first leader group and for the follower groups if the first leader group displays better performance) then the above-described selective bypassing based on reuse counters of BPT 200 may be implemented.

In some aspects, cache misses may be divided into multiple categories and bypassing mechanisms may be based on the category. For example, bypassing mechanisms may be particularly defined for the following three categories (a) instruction cache miss (b) demand load misses and (c) prefetch misses.

In the first category of instruction cache misses, bypassing allocation may be avoided because instruction cache misses are expensive and an aggressive or wrong bypassing decision can be detrimental to performance.

Among the second and third categories of demand loads and prefetch loads, respectively, more restrictive criteria may be used in bypassing decisions for the third category, prefetch loads. The restrictive criteria may pertain to decreasing the aforementioned third amount or multiplicative factor applied to the victim reuse counter (e.g., a multiplicative factor f of "0.5" may be applied to make bypassing more restrictive). Since in the case of prefetch loads, a dedicated prefetcher engine may be employed for issuing a request to memory addresses to prefetch from for anticipated future use, there is a higher probability of cache lines prefetched from those memory addresses being used in the future (assuming that the prefetch engine is accurate or well-trained). Therefore, for prefetch loads, the value of the victim reuse counter is likely to be significantly higher than the value of the contender reuse counter, compared to the respective relative values of the victim reuse counter and the contender reuse counter for the second category, demand load misses.

Furthermore, if a request to prefetch a cache line, which is issued to L2 cache 106*a-b*, for example, also misses in L3 cache 108, then allocation of the cache line corresponding to the prefetch request may be bypassed in L3 cache 108 (assuming that a memory controller, not shown, will serve that prefetch request to L2 cache 106*a-b*). This situation may arise where timing of the prefetch engine is not accurate. For example, a prefetch request for a particular address may be issued earlier or later than necessary to L3 cache 108, such that when a miss to L2 cache 106*a-b* for the same address arrives at L3 cache 108, a cache line prefetched from the address may either have been evicted (if the prefetch request was issued early) or have not yet arrived in L3 cache 108 (if the prefetch request was issued late).

Accordingly, it is seen that exemplary aspects have several advantageous features, e.g., in comparison to prior approaches. The following is a summarization of some key aspects and related advantages of this disclosure.

The set dueling in exemplary aspects for enabling or disabling bypassing avoids vulnerability to performance degradation if such flexible enabling/disabling is not provided, as the lack thereof may lead to poor bypassing decisions.

In exemplary aspects, the memory region counters may be incremented only pursuant to cache hits (i.e., reuse of the cache lines for which the cache hits occur), as described above, rather than incrementing the memory region counters on every cache access. It will be appreciated that a cache hit better represents the reuse behavior of a memory region than merely any cache access, which also includes cache misses.

In the exemplary BPT 200, bypassing decisions can be made whether or not entries corresponding to the contender or victim cache lines are present in BPT 200, as discussed above. For example, the exemplary aspects can include the above-mentioned global eviction counter (GEC) for making a bypassing decision when a victim cache line is not present in BPT 200. Furthermore, BPT 200 may be implemented as a tagged structure or an untagged structure, based on particular design needs.

Yet another advantage of exemplary aspects relates to the above-described miss counter 208 for counting the number of consecutive misses incurred in a memory region. When miss counter 208 reaches a pre-specified threshold (say, a number "N"), allocation of the cache lines falling in that memory region is not bypassed in L3 cache 108, even if the cache lines otherwise satisfy the bypassing criteria (e.g., based on a comparison of reuse counters of the incoming cache lines with potential victim cache lines). Miss counter 206 for a memory region may be reset when the memory region observes a hit.

In exemplary aspects, the multiple categories related to instruction cache misses, demand load misses, and prefetch misses may be treated differently in making bypassing decisions, which improves effectiveness of the bypassing decisions.

Figure 3:
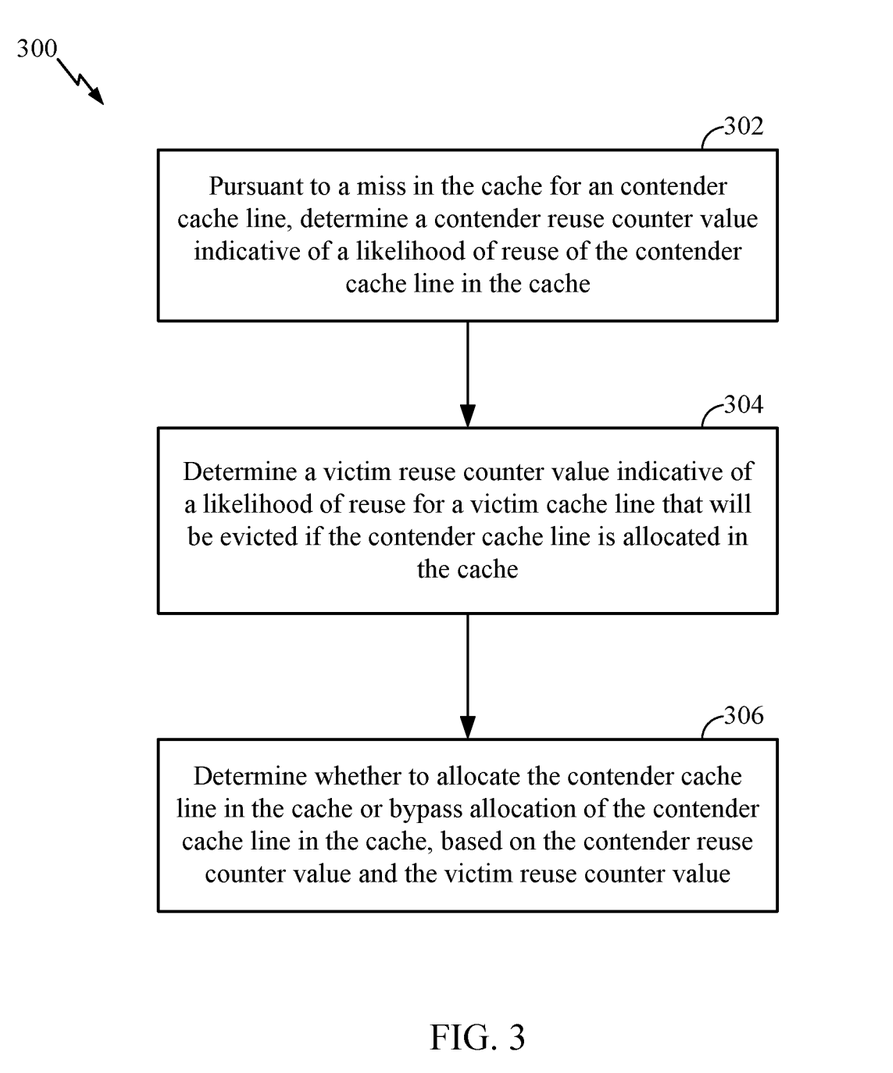
FIG. 3 depicts an exemplary method for cache management according to aspects of this disclosure.

Accordingly, it will be appreciated that exemplary aspects include various methods for performing the processes, functions and/or algorithms disclosed herein. For example, FIG. 3 illustrates a method 300 of managing allocation in a cache (e.g., L3 cache 108).

In Block 302, pursuant to a miss in the cache for an contender cache line (e.g., cache line A in FIG. 1B), determining a contender reuse counter value (e.g., the first counter in FIG. 1B) indicative of a likelihood of reuse of the contender cache line in the cache.

Block 304 comprises determining a victim reuse counter value (e.g., the second counter in FIG. 1B) indicative of a likelihood of reuse for a victim cache line (e.g., cache line B) that will be evicted if the contender cache line is allocated in the cache.

Block 306 comprises determining (e.g., by cache controller 109, using BPT 200) whether to allocate the contender cache line in the cache or bypass allocation of the contender cache line in the cache (e.g., L3 cache 108), based on the contender reuse counter value and the victim reuse counter value. For example, in some aspects, it may be determined to bypass allocation of the contender cache line in the cache if the contender reuse counter value is less than the victim reuse counter value, while some aspects, may further involve decrementing the victim reuse counter value by a second amount to generate a decremented victim reuse counter value, and determining to bypass allocation of the contender cache line in the cache if the contender reuse counter value is less than the decremented victim reuse counter value multiplied by a third amount (e.g., multiplicative factor "f").

Further, cache controller 109 may be configured to decrease the third amount, which may lead to increasing restriction on bypassing allocation of the contender cache line in the cache, and as such, setting the third amount to a low value may be an option when the contender cache line is a prefetch cache line. Furthermore, decisions whether whether to allocate the contender cache line in the cache or bypass allocation of the contender cache line in the cache may further be based on whether the miss in the cache for the contender cache line is an instruction cache miss, demand load miss, or prefetch miss As previously discussed, the above method 300 may be implemented in cases where the bypassing scheme is enabled, e.g., based on a set dueling approach. For example method 300 may initially comprise dividing sets of the cache into groups and involve flexibly enabling or disabling bypassing of allocation in the cache according to method 300 of FIG. 3, based on set dueling among the groups, with a first leader group having bypassing enabled, a second leader group having bypassing disabled, and follower groups assigned one of the bypassing policies of the first leader group or the second leader group based on respective performances of the first and second leader groups.

Furthermore, as discussed with regard to FIGS. 1B and 2, method 300 may also include organizing, in entries (e.g., entries 210*a-n*) of a bypass predictor table (e.g., BPT 200), reuse counter values (e.g., reuse counter 206) for memory regions comprising cache lines, wherein the memory region comprises two or more contiguous physical addresses. If the bypass predictor table does not comprise the contender reuse counter value in a first entry corresponding to a first memory region comprising the contender cache line, method 300 may include creating the first entry and incrementing the contender reuse counter value by a first amount. On the other hand, if the bypass predictor table does not comprise the victim reuse counter value in a second entry corresponding to a second memory region comprising the victim cache line (e.g., there is no cntr2 for victim cache line B in FIG. 1B), method 300 may include determining the victim reuse counter value based on a global eviction counter (GEC), wherein, as previously described, the global eviction counter comprises a running average of reuse counters of evicted memory regions comprising evicted cache lines.

Additionally, method 300 may also include tagging each entry (e.g., using tag 204) of the bypass predictor table with at least a portion of memory addresses belonging to the memory region corresponding to the memory region, e.g., in a tagged implementation of BPT 200. In an alternative, an untagged implementation may be chosen, wherein the bypass predictor table is an untagged structure and two or more memory regions have interference with a single entry of the bypass predictor table, wherein the interference may be one of constructive or destructive.

In some aspects, method 300 may also include tracking, in a miss counter (e.g., miss counter 206) associated with each entry, a number of consecutive misses to a memory region corresponding to the entry, and if the number of consecutive misses is greater than a pre-specified threshold, preventing bypassing allocation (e.g., implemented by cache controller 109) in the cache of the contender cache line of the memory region until a hit is observed in the cache for the memory region.

Figure 4:
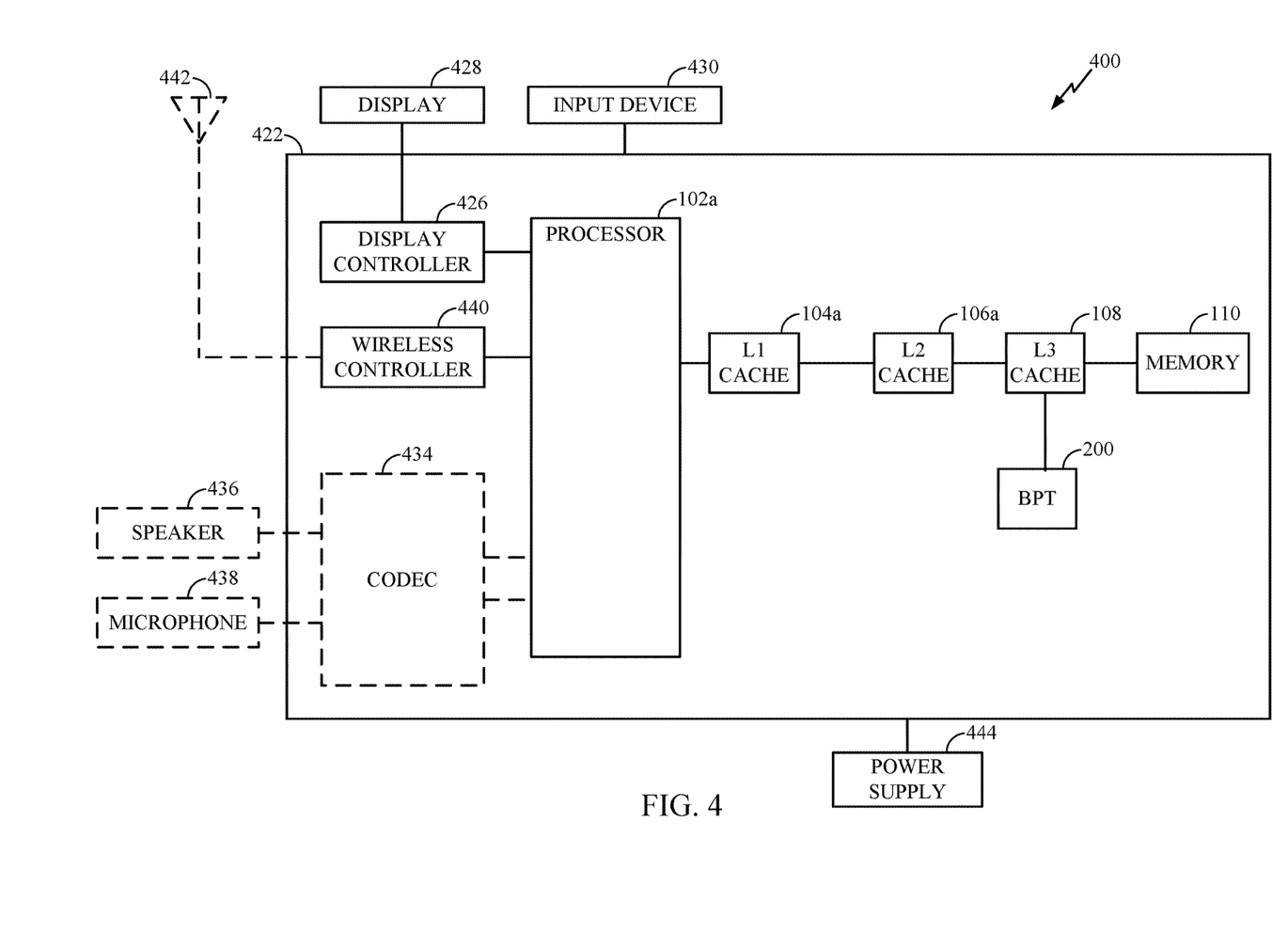
FIG. 4 depicts an exemplary computing device in which an aspect of the disclosure may be advantageously employed.

An example apparatus in which exemplary aspects of this disclosure may be utilized, will now be discussed in relation to FIG. 4. FIG. 4 shows a block diagram of computing device 400. Computing device 400 may correspond to an implementation of processing system 100 shown in FIG. 1 and configured to perform method 300 of FIG. 3. In the depiction of FIG. 4, computing device 400 is shown to include processor 102a, L1 cache 104a, L2 cache 106a, and L3 cache 108, with BPT 200 of FIG. 1 communicatively coupled to L3 cache 108, for determining allocation in L3 cache 108 according to exemplary aspects. Various other details of the components discussed with reference to FIGS. 1-2 have been omitted from FIG. 4, for the sake of clarity. Memory 110 of computing device 400 may be similarly configured as main memory 110 discussed in relation to FIG. 1. In FIG. 4, processor 102a is exemplarily shown to be coupled to memory 110 with three levels of caches comprising L1 cache 104a, L2 cache 106a, and L3 cache 108, but it will be understood that other memory configurations known in the art may also be supported by computing device 400.

FIG. 4 also shows display controller 426 that is coupled to processor 102a and to display 428. In some cases, computing device 400 may be used for wireless communication and FIG. 4 also shows optional blocks in dashed lines, such as coder/decoder (CODEC) 434 (e.g., an audio and/or voice CODEC) coupled to processor 102a and speaker 436 and microphone 438 can be coupled to CODEC 434; and wireless antenna 442 coupled to wireless controller 440 which is coupled to processor 102a. Where one or more of these optional blocks are present, in a particular aspect, processor 102a, display controller 426, memory 110, and wireless controller 440 are included in a system-in-package or system-on-chip device 422.

Accordingly, a particular aspect, input device 430 and power supply 444 are coupled to the system-on-chip device 422. Moreover, in a particular aspect, as illustrated in FIG. 4, where one or more optional blocks are present, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 generally depicts a computing device, processor 102a and memory 110, may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for managing allocation of a cache. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of managing allocation in a cache, the method comprising:

pursuant to a miss in the cache for a contender cache line, determining a contender reuse counter value indicative of a likelihood of reuse of the contender cache line in the cache;

determining a victim reuse counter value indicative of a likelihood of reuse for a victim cache line that will be evicted if the contender cache line is allocated in the cache;

determining whether to allocate the contender cache line in the cache or bypass allocation of the contender cache line in the cache, based on the contender reuse counter value and the victim reuse counter value; and dividing sets of the cache into groups and flexibly enabling or disabling bypassing of allocation in the cache based on set dueling among the groups, with a first leader group having bypassing enabled, a second leader group having bypassing disabled, and follower groups assigned one of the bypassing policies of the first leader group or the second leader group based on respective performances of the first and second leader groups.

2. The method of claim 1, organizing, in entries of a bypass predictor table, reuse counter values for memory regions comprising cache lines.

3. The method of claim 2, wherein if the bypass predictor table does not comprise the contender reuse counter value in a first entry corresponding to a first memory region comprising the contender cache line, creating the first entry and incrementing the contender reuse counter value by a first amount.

4. The method of claim 2, wherein if the bypass predictor table does not comprise the victim reuse counter value in a second entry corresponding to a second memory region comprising the victim cache line, determining the victim reuse counter value based on a global eviction counter.

5. The method of claim 4, wherein the global eviction counter comprises a running average of reuse counters of evicted memory regions comprising evicted cache lines.

6. The method of claim 2, further comprising tagging each entry of the bypass predictor table with at least a portion of memory addresses belonging to the memory region corresponding to the entry.

7. The method of claim 2, wherein the bypass predictor table is an untagged structure and two or more memory regions have interference with a single entry of the bypass predictor table.

8. The method of claim 7, wherein the interference is one of constructive or destructive.

9. The method of claim 2, wherein each of the memory regions comprise two or more contiguous physical addresses.

10. The method of claim 2, further comprising tracking, in a miss counter associated with each entry, a number of consecutive misses to a memory region corresponding to the entry, and if the number of consecutive misses is greater than a pre-specified threshold, preventing bypassing allocation in the cache of the contender cache line of the memory region until a hit is observed in the cache for the memory region.

11. The method of claim 1, comprising determining to bypass allocation of the contender cache line in the cache if the contender reuse counter value is less than the victim reuse counter value.

12. The method of claim 1, comprising decrementing the victim reuse counter value by a second amount to generate a decremented victim reuse counter value, and determining to bypass allocation of the contender cache line in the cache if the contender reuse counter value is less than the decremented victim reuse counter value multiplied by a third amount.

13. The method of claim 12, comprising decreasing the third amount to increase restriction on bypassing allocation of the contender cache line in the cache.

14. The method of claim 13, comprising setting the third amount to a low value if the contender cache line is a prefetch cache line.

15. The method of claim 1, further comprising determining whether to allocate the contender cache line in the cache or bypass allocation of the contender cache line in the cache based on whether the miss in the cache for the contender cache line is an instruction cache miss, demand load miss, or prefetch miss.

16. An apparatus comprising:
a cache;
a bypass predictor table, wherein the bypass predictor table comprises:
 a contender reuse counter configured to indicate of a likelihood of reuse of a contender cache line in the cache pursuant to a miss in the cache for the contender cache line; and
 a victim reuse counter value configured to indicate a likelihood of reuse for a victim cache line that will be evicted if the contender cache line is allocated in the cache; and
a cache controller configured to determine whether to allocate the contender cache line in the cache or bypass allocation of the contender cache line in the cache, based on the contender reuse counter value and the victim reuse counter value,
wherein the cache controller is configured to apply set dueling among sets of the cache divided into groups, with a first leader group having bypassing enabled, a second leader group having bypassing disabled, and follower groups assigned one of the bypassing policies of the first leader group or the second leader group based on respective performances of the first and second leader groups.

17. The apparatus of claim 16 wherein entries of the bypass predictor table comprise reuse counter values for memory regions comprising cache lines.

18. The apparatus of claim 17, wherein if the bypass predictor table does not comprise the contender reuse counter value in a first entry corresponding to a first memory region comprising the contender cache line, the cache controller is configured to insert the first entry in the bypass predictor table and increment the contender reuse counter value by a first amount.

19. The apparatus of claim 18, further comprising a global eviction counter, wherein the cache controller is configured to determine the victim reuse counter value if the bypass predictor table does not comprise the victim reuse counter value in a second entry corresponding to a second memory region comprising the victim cache line.

20. The apparatus of claim 19, wherein the global eviction counter comprises a running average of reuse counters of evicted memory regions comprising evicted cache lines.

21. The apparatus of claim 17, wherein each entry of the bypass predictor table further comprises a tag, wherein the tag comprises at least a portion of memory addresses belonging to the memory region corresponding to the entry.

22. The apparatus of claim 17, wherein the bypass predictor table is an untagged structure and two or more memory regions have interference with a single entry of the bypass predictor table.

23. The apparatus of claim 17, wherein each entry further comprises a miss counter configured to track a number of consecutive misses to a memory region corresponding to the entry, and wherein if the number of consecutive misses is greater than a pre-specified threshold, the cache controller is configured to prevent bypassing allocation in the cache of the contender cache line of the memory region until a hit is observed in the cache for the memory region.

24. The apparatus of claim 17, wherein the cache controller is configured to bypass allocation of the contender cache line in the cache if the contender reuse counter value is less than a third amount multiplied with the victim reuse counter value decremented by a second amount.

25. The apparatus of claim 24, wherein the cache controller is configured to decrease the third amount to increase restriction on bypassing allocation of the contender cache line in the cache.

26. The apparatus of claim 16, wherein the cache controller is further configured to determine whether to allocate the contender cache line in the cache or bypass allocation of the contender cache line in the cache based on whether the miss in the cache for the contender cache line is an instruction cache miss, demand load miss, or prefetch miss.

27. An apparatus comprising
a cache;
means for indicating of a likelihood of reuse of a contender cache line in the cache, pursuant to a miss in the cache for the contender cache line;
means for indicating a likelihood of reuse of a victim cache line that will be evicted if the contender cache line is allocated in the cache;
means for determining whether to allocate the contender cache line in the cache or bypass allocation of the contender cache line in the cache, based on the means for indicating of the likelihood of reuse of the contender cache line and the means for indicating the likelihood of reuse of the victim cache line; and
means for applying set dueling among sets of the cache divided into groups, with a first leader group having bypassing enabled, a second leader group having bypassing disabled, and follower groups assigned one of the bypassing policies of the first leader group or the second leader group based on respective performances of the first and second leader groups.

28. A non-transitory computer readable storage medium comprising code, which, when executed by a processor, causes the processor to perform operations for managing allocation in a cache, the non-transitory computer readable storage medium comprising:
code for determining a contender reuse counter value indicative of a likelihood of reuse of a contender cache line in the cache pursuant to a miss in the cache for the contender cache line;
code for determining a victim reuse counter value indicative of a likelihood of reuse for a victim cache line that will be evicted if the contender cache line is allocated in the cache;
code for determining whether to allocate the contender cache line in the cache or bypass allocation of the contender cache line in the cache, based on the contender reuse counter value and the victim reuse counter value; and
dividing sets of the cache into groups and flexibly enabling or disabling bypassing of allocation in the cache based on set dueling among the groups, with a first leader group having bypassing enabled, a second leader group having bypassing disabled, and follower groups assigned one of the bypassing policies of the first leader group or the second leader group based on respective performances of the first and second leader groups.

* * * * *